United States Patent [19]

Schulz et al.

[11] 4,177,306
[45] Dec. 4, 1979

[54] LAMINATED SECTIONAL GIRDER OF FIBER-REINFORCED MATERIALS

[75] Inventors: Ralf-Thilo Schulz, Putzbrunn; Klaus Brunsch, Weidach; Ludwig Lemmer, Ottobrunn, all of Fed. Rep. of Germany

[73] Assignee: Messerschmitt-Bölkow-Blohm Gesellschaft mit beschränkter Haftung, Munich, Fed. Rep. of Germany

[21] Appl. No.: 796,414

[22] Filed: May 12, 1977

[30] Foreign Application Priority Data

May 19, 1976 [DE] Fed. Rep. of Germany ....... 2622163

[51] Int. Cl.² ............................. B32B 5/12; B32B 7/00
[52] U.S. Cl. .................................... 428/107; 52/309.1; 52/729; 428/112; 428/113; 428/114; 428/119; 428/120; 428/295
[58] Field of Search ............... 428/105, 112, 113, 245, 428/260, 114, 119, 120, 367, 408, 295, 107; 52/729–731, 209.1; 264/DIG. 29

[56] References Cited

U.S. PATENT DOCUMENTS

| 2,528,049 | 10/1950 | Gonda | 428/138 |
|---|---|---|---|
| 3,673,058 | 6/1972 | Jackson et al. | 428/118 |
| 3,966,013 | 6/1976 | Hatch et al. | 428/120 |
| 3,995,081 | 11/1976 | Fant et al. | 428/119 |
| 4,020,202 | 4/1977 | Kreft | 428/902 |
| 4,051,289 | 9/1977 | Adamson | 428/902 |

Primary Examiner—George F. Lesmes
Assistant Examiner—P. Thibodeau
Attorney, Agent, or Firm—Toren, McGeady and Stanger

[57] ABSTRACT

Laminated sectional girders having webs and flanges may be formed to increase the shear stresses thereof by including as a structural part of the girder at least one connecting layer extending through both the flanges and webs of the girder and made of prefabricated sections with additional girder layers being arranged adjacent the sections of the connecting layer. The additional adjacent layers may comprise both fiber-reinforced material layers forming the laminated flanges of the girder as well as the webs thereof. The additional layers may be arranged either between prefabricated sections of the connecting layer or they may be arranged outside of the prefabricated sections.

11 Claims, 7 Drawing Figures

Fig. 3
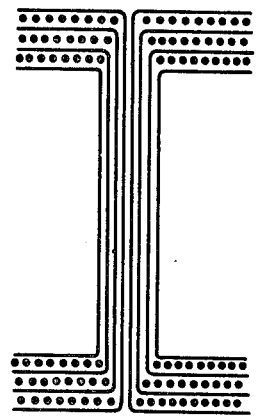
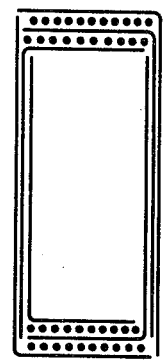
Fig. 4
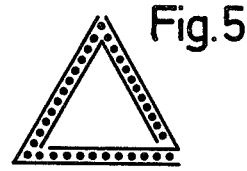
Fig. 5
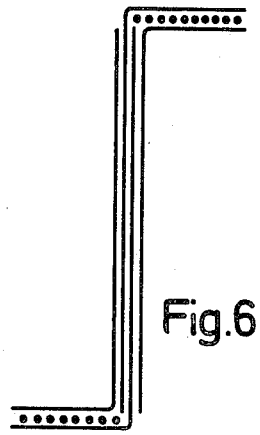
Fig. 6

LAMINATED SECTIONAL GIRDER OF FIBER-REINFORCED MATERIALS

BACKGROUND OF THE INVENTION

The present invention is generally concerned with the construction of laminated sectional girders formed of fiber-reinforced materials and including webs and flanges which are formed to consist of a plurality of material layers. More specifically, the invention is directed to an arrangement wherein such girders may be formed to include at least one layer which is designed as both a web layer and as a flange layer thereby extending as a connecting layer through both a web and a flange of the girder.

In the construction of girders of fiber-reinforced materials of conventional design, the ability to withstand large sheer forces is difficult to accomplish because only the flange surface of the girder is generally available for sheer transmission.

In the prior art, a method for the production of supporting and flexural girders whereby the physical properties of girders of fiber-reinforced material may be improved, is known from German DOS No. 2,334,645. In this method, a wound hollow body of fibers impregnated with synthetic resin is divided into several parts, with the parts being subsequently assembled to different girder forms. The webs and flanges of such girders each consist of a plurality of layers so that the sheer transmitting surfaces may, from a practical point of view, be doubled. However, in girders of this type it occurs that the sheer forces which are to be transmitted are likewise far from sufficient to enable utilization of the full potential tensile strength of the fiber-reinforced material which is utilized.

The present invention is directed toward providing a structural arrangement for laminated section girders of fiber-reinforced materials whereby the girders may be adapted to transmit greater sheer forces.

SUMMARY OF THE INVENTION

Briefly, the present invention may be described as a structural arrangement for a laminated sectional girder which is made from fiber-reinforced materials and which includes webs and flanges each consisting essentially of a plurality of layers of the fiber-reinforced materials, wherein the girder is formed to include at least two connecting layers each of which extend at least through both a web portion and a flange portion of the girder and each of which, therefore, include both a section formed as a layer of a web portion and a section formed as a layer of a flange portion. Each connecting layer consists essential of prefabricated sections which have additional layers of the girder arranged adjacent thereto, either between the sections of the connecting layer or on the outside thereof. Furthermore, each flange portion of the girder is formed to include at least one flange layer which extends exclusively through the flange portion and which is located between sections of said at least two connecting layers.

As a result of the arrangement of the present invention the surfaces which are available for sheer transmission in the girder may be doubled as compared with a prior art arrangement such as that disclosed in German DOS No. 2,334,645. This result may be accomplished, as indicated above, by providing said at least two connecting layers and said at least one flange layer which extends exclusively through a flange portion and which is located between the at least two connecting layers.

It is possible in accordance with the invention to increase the transmission of sheer forces by the arrangement of additional connecting web-flange layers to such an extent that the full tensile strength of the fiber-reinforced material is utilized.

Thus, the arrangemment of the present invention overcomes certain problems by provision of a construction wherein several sheet transmitting surfaces are provided which have not been heretofore overcome because with prior art arrangements no clean fiber deposit was capable of achievement in a reproduceable manner within the curved portions of the sections of the girder during the manufacture of the layers thereof. Only by an arrangement in accordance with the present invention with connecting layers consisting of prefabricated sections and web and flange layers arranged therebetween is it possible to obtain reproduceable sectional girders which permit a satisfactory transmission of sheeting forces.

In accordance with a particularly advantageous embodiment of the invention, the connecting layers may be formed to consist of fibers which are impregnated with synthetic resin which are either partly or fully hardened.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the Drawings:

FIGS. 3-6 each show other embodiments of sectional girders produced in accordance with the present invention.

DETAILED DESCRIPTION OF THE PREFERRED EMBODIMENTS

Figure 1:
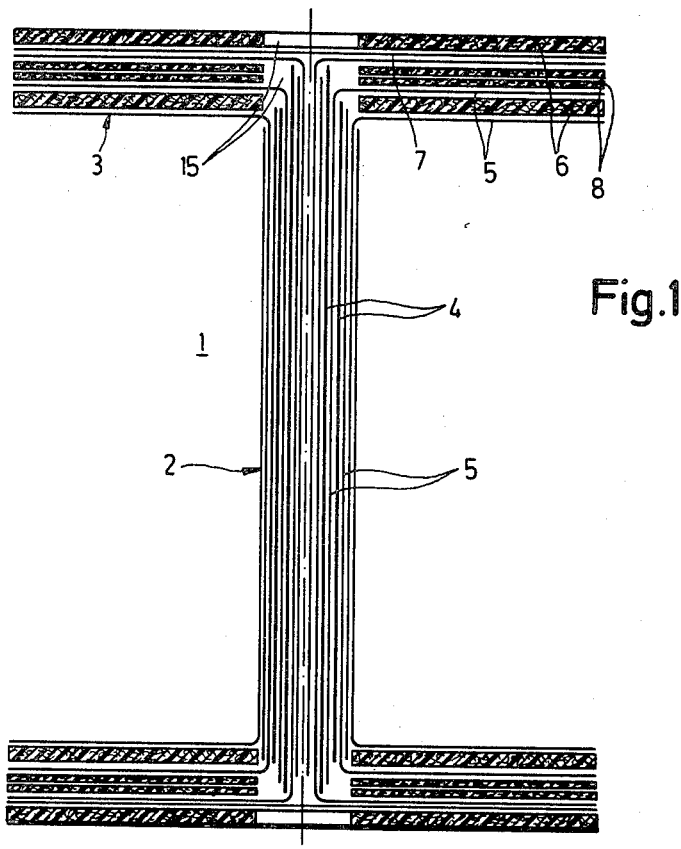
FIG. 1 is a cross sectional view of an I-girder formed in accordance with the invention.

Referring now to the drawings, there is shown in FIG. 1 a sectional I-girder which includes a web 2 and flanges 3. Each of the web and the flanges of the girder of FIG. 1 are composed of a plurality of layers, with several layers being provided in each case in the structure depicted. The web is composed of web layers 4 which extend in the range of the web and not beyond. The flanges 3 are each formed of a plurality of layers including flange layers 6 which extend only within the range of the flanges. The flange layer 6 may consist of several age-hardened parts 8 which are cemented together.

In addition to the web layers 4 and the flange layers 6, the assembly of FIG. 1 also includes connecting layers 5 which are formed to extend throughout both the web 2 and the flanges 3. Accordingly, each of the flanges 3 are composed, in addition to the flange layer 6 which are provided only in the flanges 3, of flange sections of the connecting layers 5. The connecting layers 5 in the embodiment depicted in FIG. 1 are formed as L-sections which extend over the web 2 and one of the upper or lower flanges 3. In the flanges 3 there are also provided layers 7 which extend entirely across the flanges 3 and which are inserted between the top connecting layers 5 and the flange layer 6.

The web layers 4 and the connecting layers 5, which serve primarily for the transmission of shearing of transverse forces, as well as the continuous flange layers 7, all consist of fibrous layers impregnated with synthetic resin. The layers are constructed with the fibers disposed in a crossed arrangement preferably in an angle of ±45° in order to improve the force absorption characteristics of the assembly. The fibrous layers from which the layers 4 and 5 are composed may, depending upon the selection of materials, the required stresses or the existing production facilities, consist of, for example, wound laminates or finished mats with preimpregnated fiber beds, or so called prepregs. The flange layers 6 which operate to effect the transmission of tensile and compressive forces are generally formed to be thicker than the layers 4 and 5 particularly for static reasons. The layer 6 consists of unidirectionally arranged fibers whose orientation is preferably taken to be parallel to the webs. Fiber strands impregnated with synthetic resin, or so called rovings, are preferably used for the layers 6. The flange layer 6 may also consist of prepregs or wet laminates.

Where highly stressed sectional girders are involved, it is preferred to form all of the layers from cabon fibers HT which are fibers with high tension. As a synthetic resin for impregnating the fibers, it is customary to utilize a two-component resin which may, for example, be a low viscosity epoxide resin with a quick-hardening pulverous hardener for wet lamination. A specific commercial example is CY209/HT972 made by Ciba. If prepregs are utilized, carbon fibers impregnated with synthetic resin, e.g., Fibredux 914C by Ciba, are highly suitable. It is within the concepts and framework of the invention to utilize other materials for the fibers, depending upon the stress and the method of production. For example, as the fibers there may be utilized S-glass, E-glass, Boron or Kevlar. For the production of the fiber-reinforced plastics it is also acceptable to utilize other customary resins such as, for example, epoxide, polyimide, or polyester resin.

Figure 2:
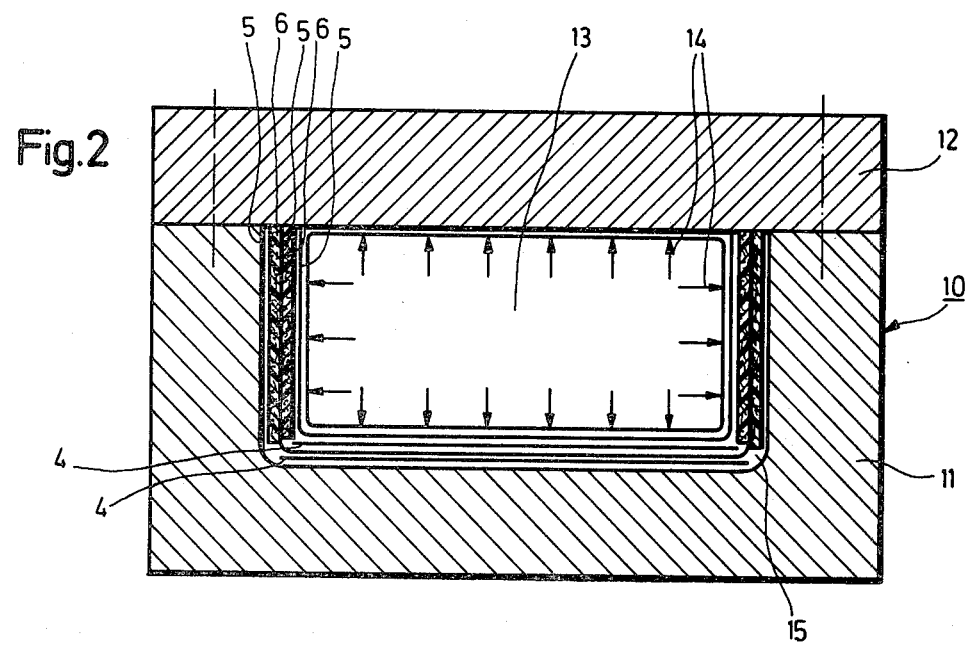
FIG. 2 is a sectional view of a mold apparatus wherein one half of an I-girder in accordance with the present invention may be produced.

FIG. 2 shows a mold assembly wherein the layers required for the production of one half of the I-girder depicted in FIG. 1 may be utilized or wherein a U-girder may be formed. The mold 10 consists of a bottom part 11 and a top part 12 both of which are made of a suitable material such as, for example, aluminum. In the mold there is arranged a dye 13 which is composed of rubber or elastic plastic material. The sectional girder which is to be produced may consist of three connecting layers 5, two web layers 4 and two flange layers 6 each. The layers are shown spaced from each other for greater clarity. However, in practice, the layers are placed closer together in the bottom part 11. Connecting layers 5, which are designed in the embodiment shown in FIG. 2, as U-sections and possibly also the web and flange layers 4 and 6, are partially prehardened. This may also be accomplished in mold 10 for example. The partial or prehardening of the layers has the effect that their positioning does not change during the molding so that the finished girder will have mostly juxtaposed layers. Furthermore, it is important that the layers do not abut during the insertion, as will be seen particularly from FIG. 1, but the respective layers are placed spaced from each other at the transition portions between the web 2 and the flanges 3. Gaps 15 are formd at the transition portions between the layers and these gaps may be filled with synthetic resin. By applying pressure on the dye 13 from interiorly thereof in order to press the interior of the mold 10 from all sides, as indicated by the arrows 14, the layers are compressed so that web layers 4 and connecting layers 5 are shielded in the range of the web. The pressing may be effected at a temperature of about 180° C. for example and at a pressure of 5 bar.

FIGS. 3 to 6 each show embodiments of other sectional girders which are assembled from prefabricated connecting layers, as well as from web layers and flange layers. For the sake of simplicity and clarity, the flange layers consisting of unidirectionally oriented fiber beds are indicated by dots which may represent rovings. The represented sectional girders depict only a selection of the girders which can be produced by means of the invention and merely are exemplary from the point of view of the overall shape and configuration of the girder assemblies which may be provided.

Thus, it will be seen that the present invention is directed toward a structure of a girder wherein both web portions and flange portions of the girder are each formed to consist of at least three layers which include at least two connecting layers extending through both a web portion and a flange portion, with the flange portion including at least one flange layer which extends exclusively through the flange portion and which is located between sections of said at least two connecting layers.

While specific embodiments of the invention have been shown and described in detail to illustrate the application of the inventive principles, it will be understood that the invention may be embodied otherwise without departing from such principles.

What is claimed is:

1. In a longitudinal laminated construction girder consisting of at least one web portion and at least one flange portion, said web and flange portions extending transversely to each other, with each being formed of a plurality of layers, each of said layers consisting essentially of a fiber reinforced structure formed of thermosetting-resin-impregnated fibers, the improvement comprising: that both said web and flange portions are each structured to consist of at least three of said layers; that said layers include at least two connecting layers which extend through both said web and flange portions; that said connecting layers are constructed with crossing fiber applications which include fibers extending at an angle transversely to the longitudinal direction of said girder; and that said at least one flange portion includes at least one flange layer which extends exclusively through said flange portion and is located between said at least two connecting layers extending through said flange portion; said at least one flange layer being structured to include unidirectional fiber applications which extend parallel to said longitudinal direction of said girder.

2. The improvement according to claim 1 wherein said transversely extending fibers of said connecting layers extend at an angle of ±45° relative to the longitudinal direction of said girder.

3. The improvement according to claim 1 wherein said at least one web portion includes at least one web layer provided between said connecting layers extending through said web portion, said web layer being located to extend exclusively in said web portion.

4. The improvement according to claim 3 wherein said at least one web layer is provided with crossing fiber applications which are arranged to extend at an angle of ±45° relative to the longitudinal direction of said girder.

5. The improvement according to claim 1 wherein said at least one flange portion includes at least one outer flange layer located outwardly from between said connecting layers, said at least one outer flange layer being located to extend exclusively within said at least one flange portion.

6. The improvement according to claim 5 wherein said at least one outer flange layer is formed to include unidirectional fiber applications extending in a direction parallel to the longitudinal direction of said girder.

7. The improvement according to claim 1 wherein said at least one flange portion includes flange layers which consist of a plurality of age-hardened individual layers which are glued together.

8. The improvement according to claim 1 wherein said layers consist of prefabricated fibrous layers.

9. The improvement according to claim 1 wherein said layers consist of wound laminates.

10. The improvement according to claim 1 wherein said layers consist of rovings.

11. The improvement according to claim 1 wherein said layers consist of layers produced by wet lamination.

* * * * *